(No Model.) 2 Sheets—Sheet 1.

A. H. PENNEBACKER.
AUTOMATIC LUBRICATOR FOR AXLES AND SHAFTS.

No. 303,040. Patented Aug. 5, 1884.

Attest;
T. Walter Fowler
H. B. Applewhaite

Inventor;
Abraham H. Pennebacker
by
Thomas P. Kinsey
atty.

(No Model.) 2 Sheets—Sheet 2.

A. H. PENNEBACKER.
AUTOMATIC LUBRICATOR FOR AXLES AND SHAFTS.

No. 303,040. Patented Aug. 5, 1884.

Attest:
J. Walter Fowler
H. B. Applewhait

Inventor:
Abraham H. Pennebacker
by Thomas P. Kinsey
Atty

UNITED STATES PATENT OFFICE.

ABRAHAM H. PENNEBACKER, OF READING, PENNSYLVANIA.

AUTOMATIC LUBRICATOR FOR AXLES AND SHAFTS.

SPECIFICATION forming part of Letters Patent No. 303,040, dated August 5, 1884.

Application filed January 30, 1884. (No model.)

*To all whom it may concern:*

Be it known that I, ABRAHAM H. PENNEBACKER, a citizen of the United States, residing at the city of Reading, county of Berks, State of Pennsylvania, have invented a new and useful Improvement in Automatic Lubrication of Axles and Shafting, of which the following is a specification.

This invention is more particularly related to that class of automatic lubricators in which a wheel, disk, or series of buckets serve to raise the used lubricating material continuously to the level of the bearings, and thus relubricate the same.

The object of the invention is to provide a simple and positive automatic lubricator not liable to derangement, and that will operate indifferently at a fast or slow rate of speed.

The drawings herewith forming a part of this specification are so fully detailed that an expert will have no difficulty in comprehending the construction and operation of the apparatus.

Figure 1:
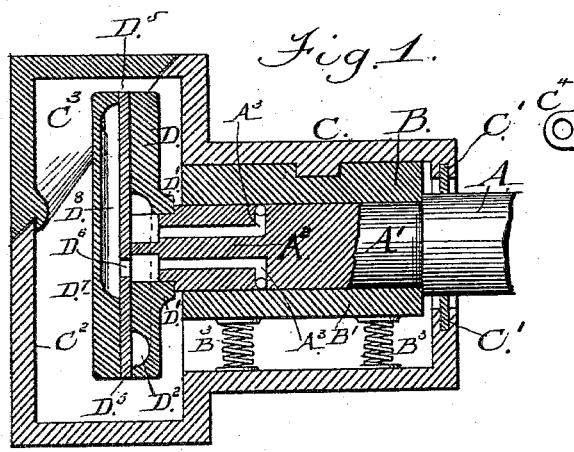
Figure 2:
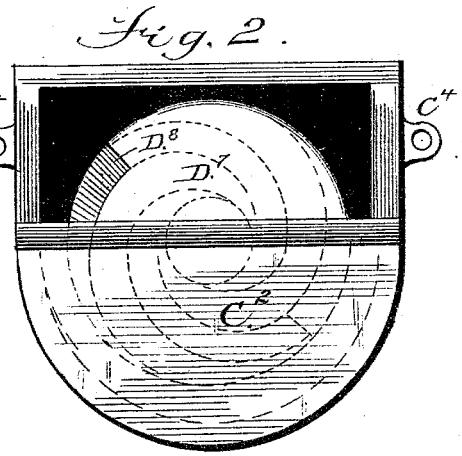
Figure 4:
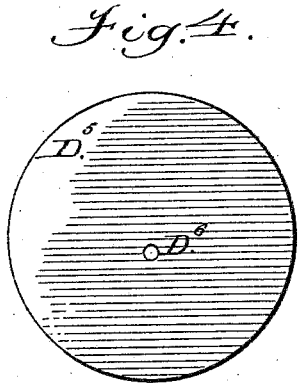
Figure 3:
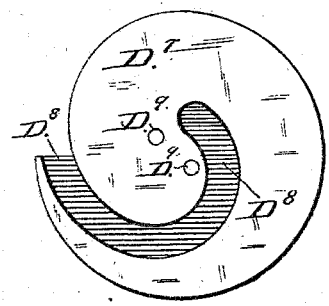
Figure 5:
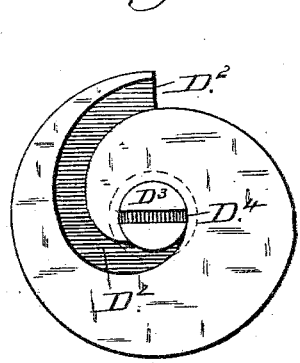
Figure 6:
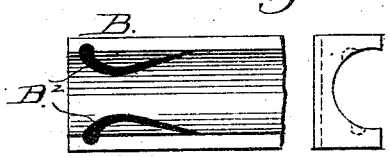
Figure 7:
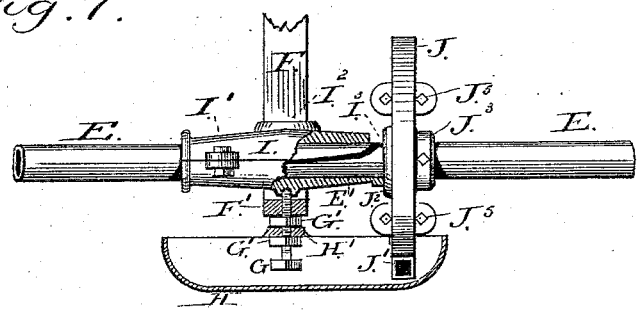
Figure 8:
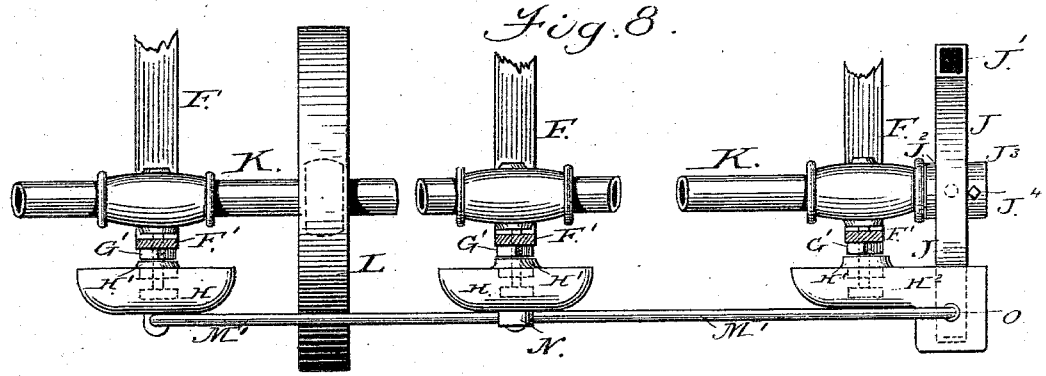
Figure 9:
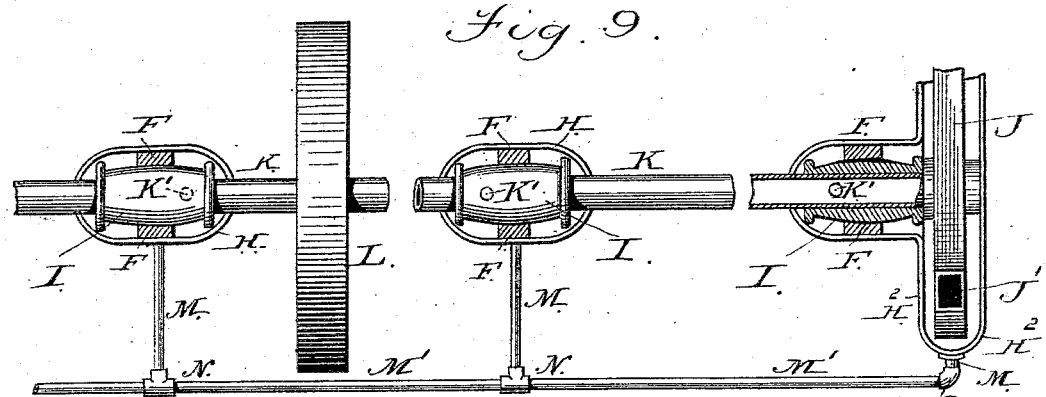

Figure 1, Sheet 1, represents in section a view of a portion of a car-axle, showing the bearing and the snail-grooved wheel for raising the lubricating material. Fig. 2, Sheet 1, is a front end view of the axle-box, and showing a partial front elevation of the snail-wheel. Fig. 3, Sheet 1, is a detached reversed elevation of the front disk of the snail-wheel. Fig. 4, Sheet 1, is a front view of the central disk of the snail-wheel. Fig. 5, Sheet 1, is a detached front view of the rear disk of the snail-wheel; Fig. 6, Sheet 1, a plan and end view of the axle-bearing. Fig. 7, Sheet 2, is a front elevation of a portion of line-shaft, bearing, hanger, drip-cup, and snail-wheel. Fig. 8, Sheet 2, is a front elevation of a hollow line-shaft, bearings, drip-cups, hangers, distributing-pipes, snail-wheels, and drip-reservoir; Fig. 9, Sheet 2, a plan of shafting arranged to carry the drip from all the drip-cups to one drip-reservoir, with a snail-wheel therein to elevate the oil or lubricating material continuously upon the bearings.

A represents a portion of a car-axle; A', the journal; A$^2$, a reduced portion of the same; A$^3$, oil-feeding holes; B, main bearing; B', sub-bearing; B$^2$, channels in bearing; B$^3$, springs or their equivalent to support the sub-bearing; C, the axle-box, having the usual seat for the bearing; C', dust-guard; C$^2$, oil or lubricating reservoir; C$^3$, cap removable for inspection; C$^4$, ears and bolts to cap; D, snail-wheel; D', hub; D$^2$, snail or lifting groove; D$^3$, bore fitting reduced portion of axle-journal; D$^4$, partition; D$^5$, central disk; D$^6$, eccentric hole in same; D$^7$, front disk of snail-wheel; D$^8$, snail-groove therein; D$^9$, holes for securing-bolts; E, line-shaft; E', a groove in the shaft for distribution of lubricating material; F, a portion of hanger; F', foot of same; G, pivotal bolt for bearing; G', lock-nuts; H drip-cup; H', arm for support of same; I, ordinary shaft-bearing; I', ears and bolts for uniting the same; I$^2$, oil-cups; I$^3$, a reduction of length in the upper bearing; J, single snail-wheel for shafts running continously in one direction; J', opening to the snail-groove; J$^2$, wearing-boss; J$^3$, hub; J$^4$, set-screw or key; J$^5$, ears and bolts. K represents a hollow line-shaft; K', lubricating holes drilled in the same at the bearings. L is a pulley secured to the shaft; M, transverse horizontal pipes; M', longitudinal horizontal discharges-pipes laid parallel with the line-shaft and at such distance therefrom as will clear the largest pulley upon the shaft; N, T-connections; O, L-connection with the reservoir drip-cup H$^2$.

The construction and operation of the lubricator involves no special skill or expensive apparatus. For the majority of cases where its application would be desirable the snail-wheel may be of tin, stamped in the requisite form; or the wheels may be cast in three separate disks, as shown in Figs. 3, 4, and 5, Sheet 1, and subsequently bolted or brazed together. I have shown a single snail-channel in Figs. 3 and 5, Sheet 1; but, if considered desirable, the channels may be increased to three or more.

For car-axles, I prefer to construct as shown in Figs. 1 to 5, inclusive, making the snail double, one right, the other left, hand, in its development. The rear disk, D, is provided with a hub, D', and a snail-channel, D$^2$, leading from the exterior of the wheel to the hub. The hub is fitted to the reduced end of the axle-bearing, and has a partition, D$^4$, dividing the same into two chambers. The end of the axle is perforated longitudinally at two places on opposite sides of said partition, and the channel D² delivers its lubricating material in one of the chambers thus secured. The disk D⁵ is plain, except a hole near its center, which corresponds with the chamber opposite to the one common to disk D. The disk D⁷ is a reverse counterpart in the channel D⁸ of the channel D², and the channel terminates over the hole D⁶ in the central disk. The disks, assembled as described, are secured upon the end of the axle by tap-bolts—one within each chamber. The longitudinal bore holes in the axle are met by right-angle holes drilled from the periphery of the journal within the bearing-face. The axle-box has a reservoir, C², at its front, which is filled with oil or lubricating material previous to starting the car upon its journey. The bearing B and the sub-bearing B′ have both directing-channels B², for the purpose of distributing over the length of the bearing the lubricating material received thereon. The sub-bearing is held in position by the springs B³, or in any other suitable manner. Thus prepared, and the car started, the snail-wheel is revolved in the same direction as the wheel, and dipping into the reservoir at each revolution, a certain portion of the lubricating material is caught and carried by the spiral channel to the center and discharged into the holes A³, from whence it oozes out upon the bearings and lubricates the same. Should the car's motion be reversed, the opposite disk is brought into action and the same result occurs. On line-shafting, where each journal is separately provided with a snail-wheel, a single channel-snail is all that is required. The drip-cup is lengthened, and the wheel brought up close to the end of the bearing-box and there secured by key or set-screw. Dipping into the drip-box, the revolution of the wheel in the oil or lubricating material will deliver the same at the top surface of the shaft, the latter having a spiral channel, E′, cut therein by a round-nosed chisel, to secure a free delivery. I prefer to shorten the top bearing, as shown at I³ in Fig. 7. For rolling and other mill shafts that are frequently reversed, it will be better to use the double snail, to facilitate the introduction of the automatic lubricators. They may be constructed in halves, with ears and bolts, as shown in Fig. 7, when they are readily applied to line-shafting already in use.

Figs. 8 and 9, Sheet 2, show a modification in lubrication, by which an entire line of shafting may be controlled by one snail-wheel placed at either end or central to the line-shaft. In this arrangement the drip-cups H are connected by transverse and longitudinal horizontal pipes M M′, by which they are made to deliver all the lubricating material dripping from the several bearings into the end or central reservoir drip-cup H², from whence it is elevated again by the snail-wheel J, and discharged within the shaft and redistributed over the bearings, the material passing out of the shaft K at the perforations K′, made at each bearing-point.

In operating a hollow shaft, it is first filled with the lubricating material, the holes K′ being covered by the bearing or cap, and therefore allowing no access of air. The material will not weep out only as drawn by capillary attraction during the revolution of the shaft. The drip-cups should be protected as much as possible from the dust when operated in the above manner.

Car boxes and axles supplied with my improvement would require no packing of wool or equivalent capillary material to raise the agent of lubrication to the bearing, and which in a short time becomes clogged and refuses to act; nor would the lubrication of the bearing be dependent upon the jerking of the train and the splashing of the contents of the box in that uncertain manner upon the journal; but for every revolution of the wheel a positive amount of lubricating material will be lifted from the reservoir and placed upon the bearing, and this will be done whether the train is running forward or backward. In its application to line-shafting it does away with the uncertainty in the use of the hand oil-can or of oil-cups and the drip of oil when applied in excessive quantities to the bearings. The drip-cups are filled to a reasonable height before starting up the shafting, and the snail-wheel will elevate the same continuously upon the bearing as long as any lubricating material is within reach of the same.

I am aware that automatic lubricators *per se* are not new, and that car axles and shafts have been provided with lifting-disks for the purpose of continuous lubrication; but I believe my mode of constructing and operating the same in combination with the axle and shaft to be a novel and useful advance upon all prior applications of the same.

Having disclosed the operation and construction and shown the advantages of my invention, I desire to secure by Letters Patent the following claims thereon:

1. As a new article of manufacture for automatic lubrication of car-axles and reversible line-shafting, a snail-wheel composed of the following elements: a rear disk provided with a hub for attachment to the end of a car-axle and having one or more snail-like grooves in its face, starting from the periphery of the wheel and terminating at the bore of said hub, a partition dividing a portion of the hub depth into two chambers, a plain central disk having an aperture corresponding with one of the chambers, and a front disk or cap with one or more spiral or snail grooves on its inner face, starting from the periphery of the disk and terminating in a reverse direction over the perforation in the central disk, all combined in a suitable manner and secured to the end of the axle or upon the shaft in any convenient manner, substantially as and for the purpose shown and described.

2. In combination with a snail-wheel, as described, a car-axle journal reduced on its end for the reception of said snail-wheel, and provided with two longitudinal perforations extending beneath the bearing of the journal, said perforations being connected with the face of the journals by drilling holes at right angles therewith, whereby the lubricating material raised by the snail-wheel is distributed over the bearings, as shown, and for the purpose set forth.

3. In combination with line-shafting reversible in its motion and secured thereto, a double snail-wheel composed of three disks similar to that shown in Figs. 1 to 5, inclusive, except that the entire series of disks are centrally pierced to fit the diameter of the shaft to which they are applied, the termination of the snail-grooves being on a line with the peripheries of the shaft-journals, the shaft having a spiral groove, E', leading from the face of the small hub to the center of the bearing, and the cap of the bearing shortened at $I^3$, for the purpose described.

4. In combination with a line-shaft running continuously in one direction, a snail-wheel J, composed of two disks, and a snail-channel between the same secured to the shaft next to the bearing, said bearing provided with a spiral groove, E', and the cap thereof shortened for the purpose set forth.

5. In combination with a single snail-wheel, J, secured at the ends of or central thereto, a line of shafting, K, provided with a hollow core thoughout its length, and at each bearing a hole or holes, K', and drip-cups H, connected by pipes M M', and connections N and O, with a reservoir-drip, $H^2$, whereby the lubricating material dripping from said bearings is carried to the reservoir-drip $H^2$, and lifted therefrom and discharged within the interior of said hollow shaft, and lubricating the journals thereof through the holes K', substantially as shown, and for the purpose described.

6. In combination with a double snail-wheel, car-axle, and the bearings for the same, a car-axle box of the form shown, having the usual bearing-seat and rear dust-guards, and provided with a front oil or lubricating-material reservoir, the base being a semicircle in front elevation and the top a flat parallelogram, the front corner lifting off for inspection, substantially as shown, and for the purpose set forth.

ABRAHAM H. PENNEBACKER.

Witnesses:
THOMAS P. KINSEY,
F. PIERCE HUMMEL.